United States Patent [19]
Lunden

[11] 3,874,521
[45] Apr. 1, 1975

[54] STRIPPING MECHANISM FOR LUMBER STACKERS

[75] Inventor: Sidney L. Lunden, Spokane, Wash.
[73] Assignee: Moore-Iem, Inc., Spokane, Wash.
[22] Filed: Mar. 20, 1974
[21] Appl. No.: 452,824

[52] U.S. Cl................. 214/6 DK, 271/84, 271/189
[51] Int. Cl.............................................. B65g 57/10
[58] Field of Search......... 214/6 DK, 6 M, 6 H, 6 P; 271/84, 189, 190, 191

[56] References Cited
UNITED STATES PATENTS

| | | | |
|---|---|---|---|
| 2,397,720 | 4/1946 | Beane | 214/6 DK X |
| 2,915,202 | 12/1959 | Aitken | 214/6 DK |
| 3,343,689 | 9/1967 | Fehely | 214/6 DK |
| 3,393,812 | 7/1968 | Mayo et al. | 214/6 DK |
| 3,760,959 | 9/1973 | Newnes | 214/6 DK |

Primary Examiner—Albert J. Makay
Assistant Examiner—Leslie J. Paperner
Attorney, Agent, or Firm—Wells, St. John & Roberts

[57] ABSTRACT

An improvement in layer stripping means is disclosed for lumber stacking machines wherein successive layers of boards are stripped onto a stack from a layer handling means. The improved stripping means is comprised of a pair of circular discs sandwiching a smooth, toothless chain sprocket. The discs and sprockets are rotatably mounted to the stacking machine adjacent the front of the machine. A powered roller chain extends about the toothless sprocket to normally rotate the discs about their axes in a forwardly rotating motion. The rearward board of each layer held on the layer handling means is brought into contact with an abutment surface defined by the peripheral edges of the rotating discs, as the handling means is moved rearwardly. Such engagement halts rearward movement of the layer while the layer handling means continues to move rearwardly. The layer is thereby stripped onto the stack. The rotating discs, however, present a biasing means for urging the engaged rearward board downwardly to prevent it from becoming disoriented or otherwise buckling in the layer as a result of the rearward force from the retracting layer handling means.

4 Claims, 8 Drawing Figures

STRIPPING MECHANISM FOR LUMBER STACKERS

BACKGROUND OF THE INVENTION

The present invention relates basically to the field of art of lumber stacking machines and more particularly to an improved layer stripping mechanism for such stackers.

A good percentage of presently-utilized lumber stacking machines are of the type wherein individual layers of boards are moved by fork arms from a layer pickup station on the stacking machine, forwardly over layer stripping members, then lowered in front of the stripping members and retracted to strip the layer onto a stack below.

Conventionally, the stripping members were comprised of stationary bars mounted to the front of the stacking machine. As the fork arms were retracted past the stripping members, the last or rearward board of the layer would engage the stripping members and hold the layer stationary as the fork arms were retracted below. It is a difficult problem, however, to prevent the rearward board from tipping up or otherwise "buckling" the layer as the fork arms are retracted. This problem is caused primarily from the rearward pushing force of the layer against the engaged rearward board. A further problem is that often the stacking arms are inclined so as the arms are retracted, the rearward board engages the stripping members and is simultaneously moved downwardly as the inclined fork arms are retracted. This downward movement, in combination with the rearward force from the remainder of the layer and retracting arms frequently causes the rearward board to flip upwardly onto the layer being deposited, or otherwise "buckle" the layer and hamper formation of subsequent layers.

It is therefore a first object of my invention to provide an improved layer stripping means that substantially eliminates the above problem by providing rotatable discs that will engage and urge the edge of the rearward board downwardly as the arms are retracted, thereby holding it snugly in position relative to the remaining boards of the layer.

It is a further object to provide such an improvement that may be easily incorporated with existing stacking machinery.

It is a yet further object to provide such an improvement that is extremely simple in construction and thereby substantially maintenance-free.

These and other objects and advantages will become apprent upon reading the following description which, taken with the accompanying drawings, disclose a preferred form of the present invention.

BRIEF DESCRIPTION OF THE DRAWINGS

A preferred form of the present invention is illustrated in the accompanying drawings in which.

DESCRIPTION OF A PREFERRED EMBODIMENT

Figure 1:
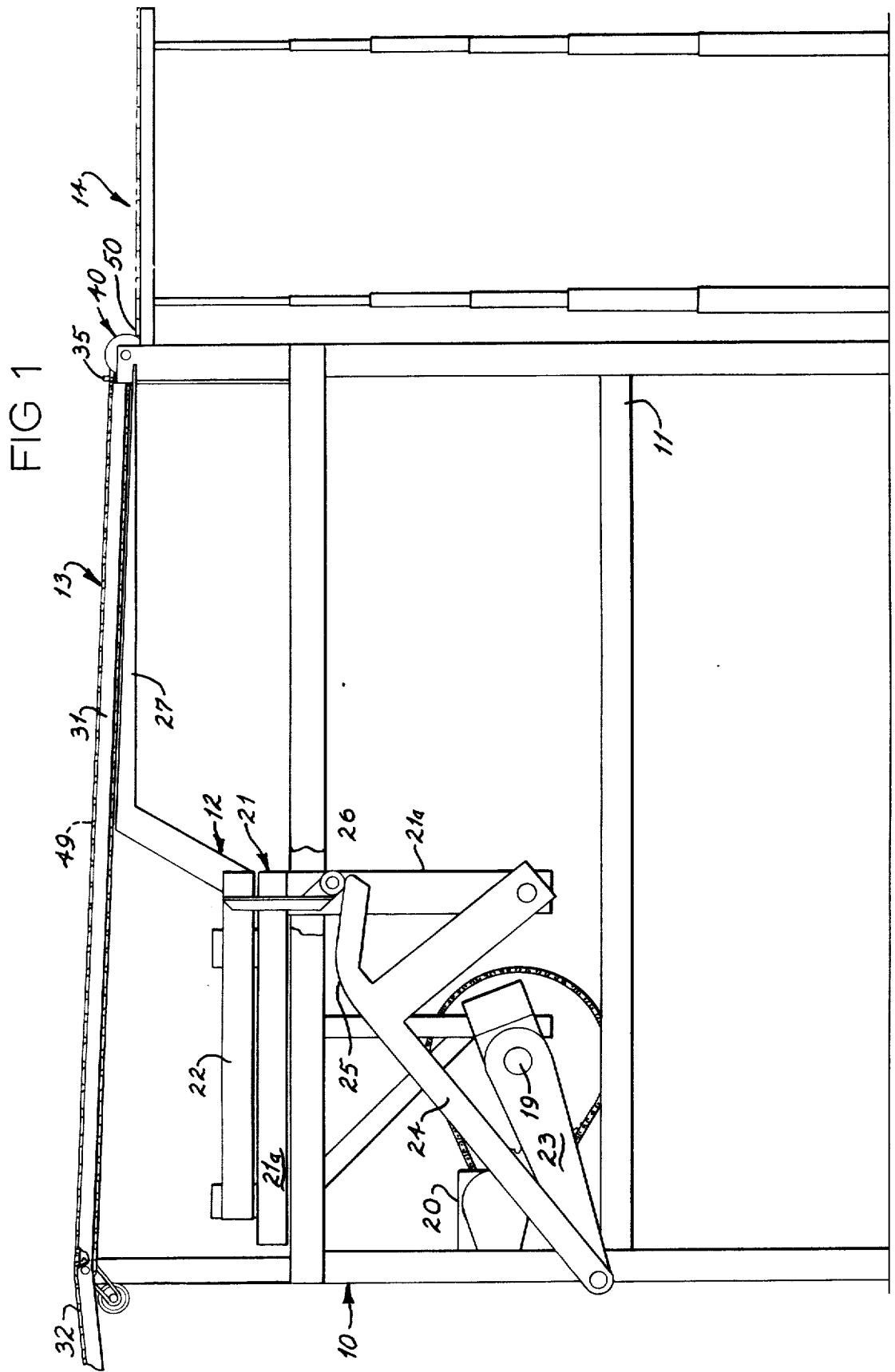
FIG. 1 is an elevational view of a known stacking machine with the improvement of the present invention mounted thereto.
Figure 6:
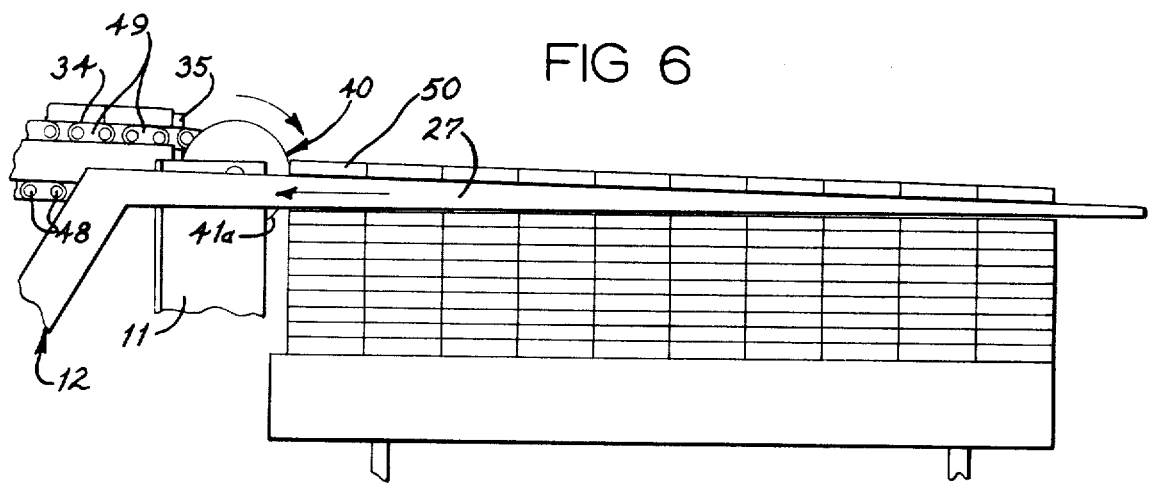
FIGS. 6–8 are diagrammatic operational views illustrating the operation of the present improvement.
Figure 7:
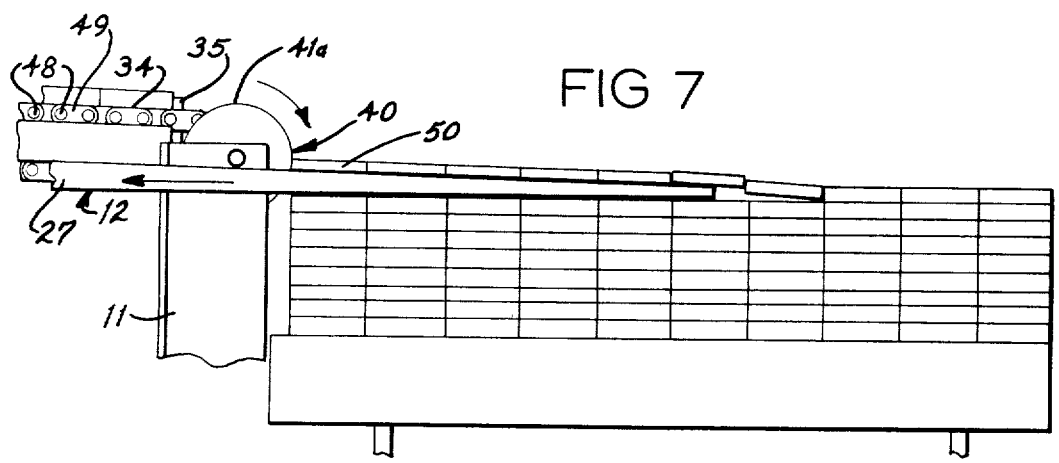
Figure 8:
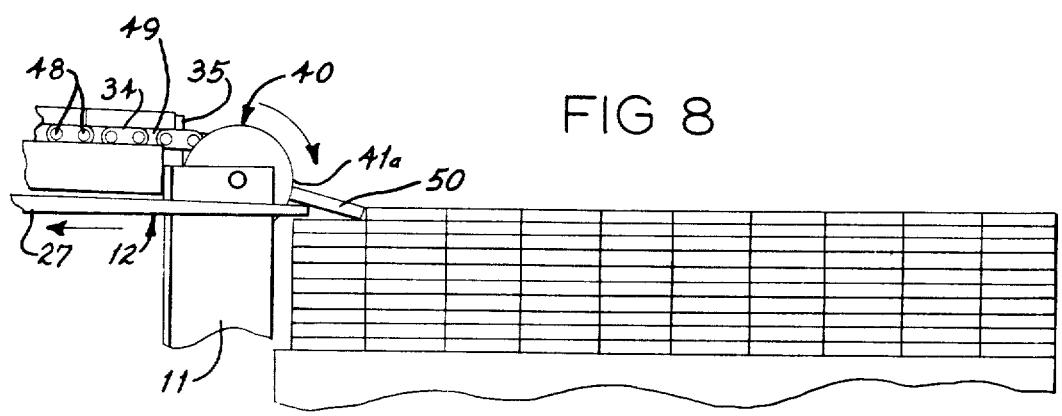

Referring now to the drawings in greater detail, a stacking machine utilizing improved stripping means of the present invention is generally designated in FIG. 1 by the reference numeral 10. Such stacking machines typically include an upright framework 11 that movably supports a reciprocable layer handling means 12. The layers of boards are delivered to the stacking machine 10 and are located along the upper surface of the stacking machine at a loading station 13. Layer handling means 12 is utilized to lift individual layers from the loading station 13 and move them forwardly to a stacking station 14. At the stacking station 14, the the layers are deposited onto a stack 15 as illustrated in FIGS. 6–8.

The loading station 13 includes a support table 31 that is indexed downwardly to receive successive layers of boards. Endless roller chains 34 are provided across the support table and extend the length of support table 31. Chains 34 are powered to deliver the layers of boards to the loading station 13. Boards are received by the chains 34 from feed chains 32 that lead from a hopper or other supply source (not shown). Roller chains 34 are operated continuously to supply boards to the loading station 13. Stationary stops 35 are provided toward the front of the stacking machine (FIG. 2) to halt further forward movement of the layers past the loading station 13. The stops 35 engage and halt movement of the layers so that the roller chains 32 slide frictionally underneath the layers.

Stacking machines such as the machine illustrated in FIG. 1 generally include a motor 20 and drive linkage consisting of opposed crank arms 23 and a connecting links 24 for driving a carriage 21 of the layer handling means 12. Crank arms 23 are mounted to a drive shaft 19 which is powered to rotate by motor 20. Links 24 extend between the crank arms and carriage 21. Carriage 21 is comprised of a "T" shaped rolling section 21a and a lifting section 22 that is movably mounted to rolling section 21a. Fork arms 27 are fixed to lifting section 22 and protrude forwardly therefrom. Motor 20 provides means for driving the layer handling means in a reciprocating motion forward and backward along the framework 11. It further controls vertical movement of the lifting carriage 22 through means of cams 25 and followers 26. The cams 25 are an integral part of connecting arms 24. Followers 26 are mounted to lifting section 22 and engage the working surfaces of cams 25. As the crank arm 23 rotates, cam 25 pivots angularly about a wrist pin axis determined by a pivotable connection between connecting arm 24 and the depending leg section of the "T" shaped rolling carriage 21a. The angular movement of cam 25 forces the lifting carriage 22 upwardly with respect to rolling carriage 21a. Cam 25 is designed such that at the beginning of an operational cycle, the lifting carriage 22 is lifted upwardly to engage and lift a layer of boards stationed above at the loading station 13 and held at that raised position as the handling means is moved forwardly, bringing the layer supported thereby to stacking station 14. At this position, cam 25 allows lifting carriage 22 to be lowered to the original lowered position as shown in FIG. 1. Continued rotation of crank arm 23 then pulls the layer handling means rearwardly to strip the layer onto the stack 15.

It should be noted that the illustrated stacking machine is shown simply to exemplify a single species of stacking machines that may be utilized efficiently with the present invention. It is well understood that various other stacking mechanism may be utilized in conjunction with the present invention without adversely affecting its utility. It is further understood that such mechanism utilize stripping means, usually comprised of a stationary abutment surface to aid in stripping layers onto a stack. It is the purpose of the present invention to provide substantial improvement in such stripping means.

A stripping means 40 comprising a preferred form of the present improvement is illustrated in substantial detail in FIGS. 2–5. It may be understood that although only one stripping means is illustrated, several will normally be utilized in conjunction with chains 34 across the width of the stacking machine.

Each stripping means 40 is basically comprised of a pair of circular discs 41 sandwiching a toothless chain sprocket 47. The discs 41 and sprocket 47 of each mechanism 40 are fixed to one another and are mounted to the stacking machine framework 11 for free rotation thereon about fixed axes. The stripping means 40 are designed to be utilized in conjunction with the endless roller chains 34.

Chains 34 are utilized as a biasing means for operating the discs 41 to rotate, moving peripheral edges 41a thereof in a forward direction about the fixed axes. This biasing means is an important feature of my invention and will be discussed in greater detail below.

Figure 2:
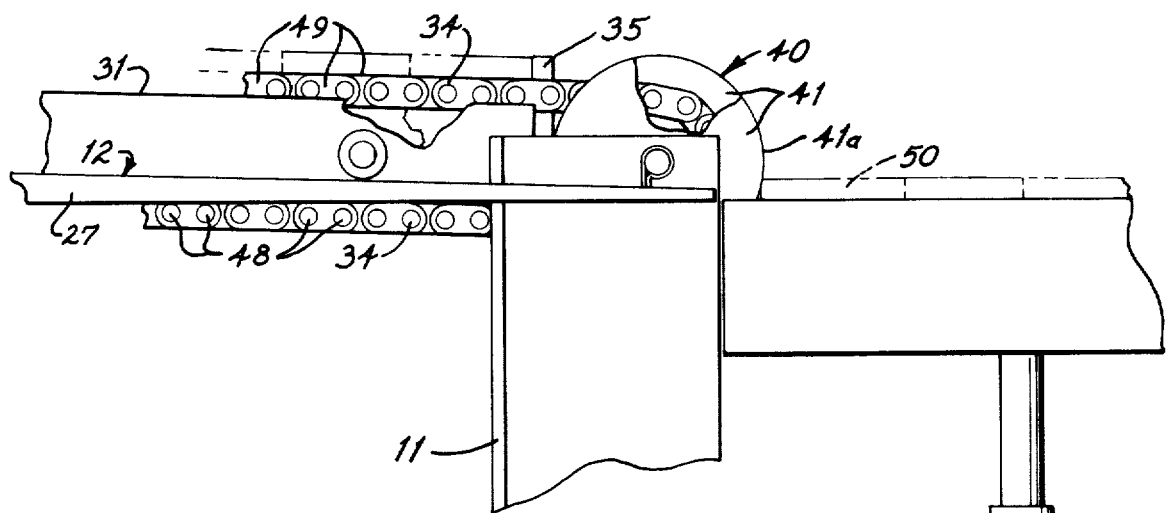
FIG. 2 is an enlarged detailed elevational view of the improvement of the present invention and a portion of the stacking machine.
Figure 3:
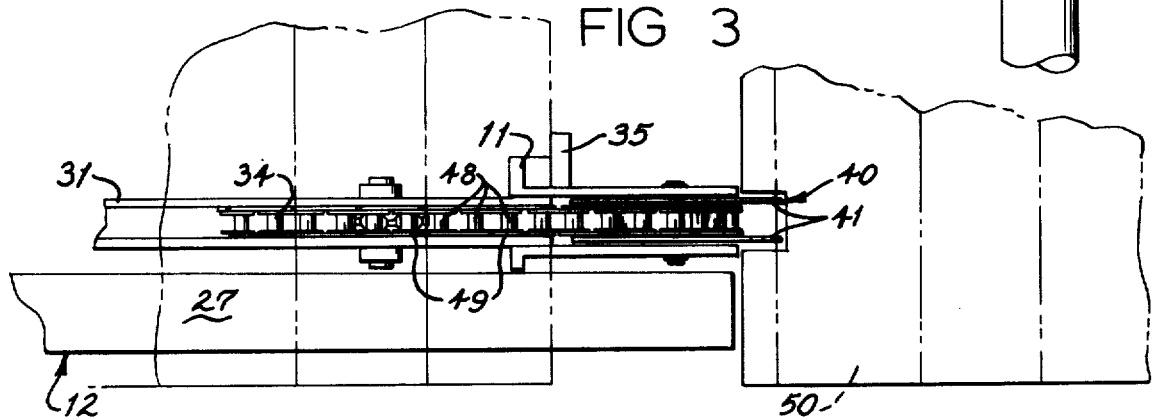
FIG. 3 is a plan view of the improvement and elements associated therewith shown in elevation in FIG. 2.
Figure 4:
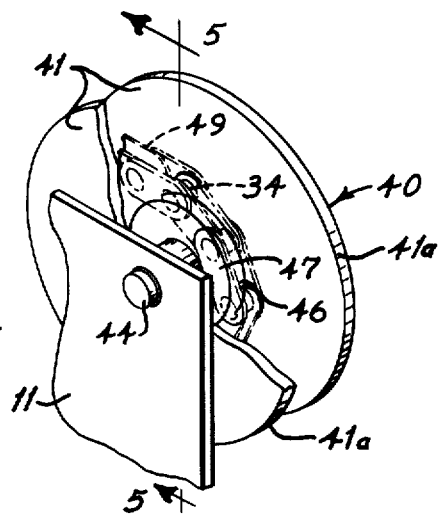
FIG. 4 is an enlarged fragmentary isometric view of a single improved stripping means.

The stripping means 40 as shown in FIGS. 1, 2 and 3 are mounted to the forward end or front of framework 11 with thier rotational axes fixed on the framework coaxially across the width of the stacking machine. As may be noted in FIG. 3, the axes are also parallel to the length of the boards in the stack 15.

The stripping means 40 are mounted to the framework so that the circular peripheral edges of discs 41 present abutment surface 41a that extend forwardly of the stacking machine and are located adjacent the top inside edge of the stack (FIG. 2).

Figure 5:
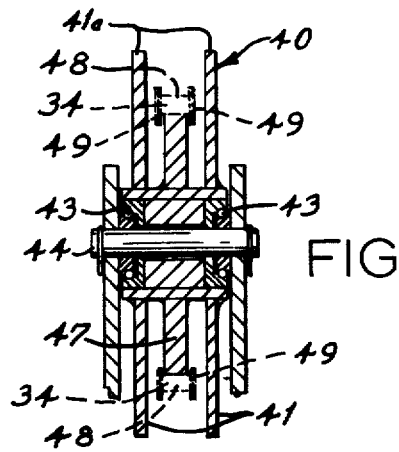
FIG. 5 is a sectioned view taken along line 5—5 in FIG. 4.

FIG. 5 illustrates in substantial detail, the relationship of the basic elements comprising the present improvement. As shown, discs 41 are fixed to a cylindrical collar 42 that is mounted to an axle shaft 44. Discs 41 and collar 42 are freely rotatably carried on shaft 44 by bearings 43. Sprocket 47 is also fixed to collar 42 and rotates therewith about the axis of shaft 44. Bearings 43 thereby enable rotation of discs 41 and sprockets 47 about the axes of shafts 44 in response to movement of the roller chains 34.

Chain 34 each include a plurality of rollers 48 interconnected by a number of link members 49. Each chain 34 extends about a sprocket 47 so rollers 48 engage a smooth peripheral edge 46 of sprocket 47. Link members 49 are located on each side of the sprocket 47 to serve as guides for preventing the chain from slipping laterally off sprocket 47. Frictional engagement between the peripheral surface 46 and chain rollers 48 serve to affect a responsive forward rotational biasing movement of discs 41 about the axis of shaft 44.

The smooth surface 46 of sprocket 47 provides a somewhat slidable relationship between the chain rollers 48 and the stripping means to provide a "friction clutch means" whereby the discs 41 are urged to normally rotate about the axis of shaft 44. However, when the abutment surface 41a is engaged by a rearward board 50 of a layer being deposited onto stack 15, rotation of discs 41 is obstructed. When this occurs, the chain 34 simply slips over the smooth peripheral surface 46 of sprocket 47. This sliding frictional engagement serves to apply a continuous torsional force which is transferred by the discs 41 to the engaged board 50.

Operation of the present invention may now best be understood with reference to FIGS. 6–8. FIG. 6 illustrates a position of layer handling means 12, after the layer has been lowered to a position immediately over the stack. Once in this position, the handling means 12 is retracted to pull the fork arms 27 from beneath the layer presently held thereon.

As may be noted in FIGS. 6–8 and in FIG. 1, fork arms 27 are inclined similarly to the incline of support table 31. Therefore, the rearward board 50 of the layer must be lowered a substantial distance before it is deposited onto the stack. This condition may best be understood by examining FIGS. 6–8 in order, and noting the relative elevational positions of board 50 against the surface 41a as the fork arms 27 are retracted.

As fork arms 27 are retracted, board 50 engages the abutment surface 41a of discs 41. Rearward movement of board 50 and the remainder of the layer is thereby halted. Board 50 is prevented from flipping upwardly, as result of rearward force from the retracting fork arms, and by the downward torsional force applied by the stripping means 40. During such engagement, the chains 34 slide frictionally over sprockets 47 since the engaged board 50 hinders their rotations.

Continued retraction of the fork arms 27 results in corresponding downward movement of the baord 50 as the layer is deposited onto the stack.

Finally as the fork arms are moved to the fully retracted position, rearward board 50 is deposited neatly onto the stack with the aid of stripping means 40 as they gently urge the rearward edge of board 50 downwardly onto the stack.

It may have become apparent from reading the above description and examining the accompanying drawings that various changes and modifications may be made therein without departing from the intended scope of my invention. Therefore, only the following claims are to be taken as definitions of my invention.

What I claim is:

1. In a lumber stacking machine having a supporting framework for receiving layers of boards at a layer loading station with each layer having a forward and rearward board and a lyer handling means movably mounted to the framework for vertical and horizontal movement thereon for (a) lifting successive layers of boards from the loading station, (b) moving the layers forwardly along a forward path, transverse to the lengths of the boards in the layers to a stacking station, (c) lowering the layers to a stack of boards at the stacking station and subsequently, (d) retracting to move the layers in a rearward path against abutment surfaces of a stripping means on the framework, and thereby strip the layers onto the stack as the layer handling means continues to retract, an improvement wherein the abutment surfaces are movable downwardly and are operatively connected to a biasing means for urging downward movement of the abutment surfaces to thereby urge the rearward board engaged therewith downwardly preventing the rearward board from buckling or becoming otherwise disoriented from the layer as the layer handling means is retracted.

2. The improvement set forth in claim 1 wherein the abutment surfaces are defined by peripheral edges of a plurality of rotatable discs mounted to the framework for rotation about fixed axes parallel to the lengths of the boards in the layers, said discs being circular in configuration about said axes and including peripheral edges for engaging the rearward board as the layer handling means is retracted; and wherein said biasing means is operated to rotate said discs forwardly about their axes.

3. The improvement set out in claim 2 further comprising:

friction clutch means operatively connecting the biasing means and the discs enabling the rearward board to hinder rotation of the discs upon engagement therewith as the handling means is retracted.

4. The improvement set out in claim 3 wherein the clutch means is comprised of toothless sprockets coaxially fixed to the discs, said toothless sprockets being of smaller diameter than the discs, each sprocket having smooth continuous peripheral edge; and wherein the biasing means is comprised of a plurality of elongated endless roller chains extending forwardly along the framework from a power means to said toothless sprockets with said chains having chain rollers engaging the peripheral edges of the toothless sprockets, whereby powered movement of said chains frictionally urges corresponding forward rotational movement of the discs about said axes.

\* \* \* \* \*